United States Patent
Ignaczak et al.

(10) Patent No.: US 7,231,694 B2
(45) Date of Patent: Jun. 19, 2007

(54) PIPE CLAMP WITH IMPROVED FASTENER

(75) Inventors: Brian T Ignaczak, Rochester, MI (US); Michael E Amedure, Lake Orion, MI (US)

(73) Assignee: Breeze Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 11/285,704

(22) Filed: Nov. 21, 2005

(65) Prior Publication Data

US 2006/0107498 A1    May 25, 2006

Related U.S. Application Data

(60) Provisional application No. 60/629,569, filed on Nov. 19, 2004.

(51) Int. Cl.
*F16L 33/04*    (2006.01)
(52) U.S. Cl. .............. 24/279; 24/284; 24/286; 248/74.1
(58) Field of Classification Search ............ 24/279; 248/74.1, 73; 411/411, 416, 424, 399
See application file for complete search history.

(56) References Cited

U.S. PATENT DOCUMENTS 1,414,979 A * 5/1922 Carter ................ 411/366.1
1,479,317 A * 1/1924 Peirce .................... 24/275
3,189,969 A * 6/1965 Sweet .................... 24/279
6,269,524 B1 * 8/2001 Cassel ................... 24/279
6,877,191 B2 * 4/2005 Logan et al. ............ 24/279
6,877,780 B2 * 4/2005 Potts et al. ............. 285/420

* cited by examiner

*Primary Examiner*—Robert J. Sandy
*Assistant Examiner*—Marcus Menezes
(74) *Attorney, Agent, or Firm*—Reising, Ethington, Barnes, Kisselle, P.C.

(57) ABSTRACT

A band clamp having a band and a nut and bolt fastener. The band includes radially-extending opposed flanges each having an aperture for receiving the bolt. The bolt has a shank that includes a neck, a threaded body for receiving the nut, and a tapered transition from the neck to the threaded body. In one embodiment, the tapered transition extends only partially around the shank such that a portion of the neck has a common surface with the body. During tightening, the radially inward facing surface of the aperture in the flange can engage the threaded body and slide along the threaded body across the common surface and onto the neck without having to traverse and ride up over the tapered transition. In another embodiment, the nut has an angled shoulder that engages the tapered transition when the nut is tightened to the desired axial position on the bolt.

18 Claims, 4 Drawing Sheets

PIPE CLAMP WITH IMPROVED FASTENER

CROSS-REFERENCE TO RELATED APPLICATION

This application claims the priority of U.S. Provisional Application No. 60/629,569, filed Nov. 19, 2004, the entire contents of which are hereby incorporated by reference.

FIELD OF THE INVENTION

This invention generally relates to pipe clamps such as band clamps, pipe couplers and the like.

BACKGROUND OF THE INVENTION

Band clamps are commonly used for connecting pipes, hoses, and other tubular members together, such as exhaust pipes of an automotive exhaust system. Such connections are typically constructed in a telescopic overlap joint or in an end-to-end butt joint of two tubular members. To be effective, the connection between the tubular members should provide a suitable fluid-tight seal to prevent leakage. The connection should also have a high degree of mechanical strength and be capable of easy disassembly.

A conventional band clamp includes a band defined by a cylindrical body portion that circumscribes tubular members to be joined. The cylindrical body terminates in opposed, radially extending connection flanges, which are loosened or drawn together around the tubular members by a fastener extending transversely through the flanges. As the fastener is tightened, the opposed flanges are cinched together, thereby applying a strain on the band. This strain creates a radially-directed, compressive clamp load on the tubular members. A reaction member may be provided between the flanges to provide a more even distribution of radial forces on the tubular members as the band is cinched by the tightening of the fastener. In any case, the fastener should be capable of exerting consistent fastening forces that draw the flanges of the band together to impart consistent clamp loads from the band to the tubular members.

Some conventional band clamp designs do not always yield consistent clamp loads—especially when tolerance stackups of band clamp components yield interference conditions when fastening the band clamp. An exemplary conventional band clamp 210 and associated bolt 248 are depicted in prior art FIGS. 6 through 9. As shown in FIG. 6, the bolt 248 includes a head 256 defining one end of the bolt 248, and a cylindrical shank 276 that extends longitudinally away from the head 256 and terminates in an opposite end of the bolt 248. The shank 276 includes a slotted neck 280 with close-ended slots 281, a threaded body 284 of relatively reduced diameter compared to the slotted neck 280, and a conical transition 286 provided between the neck 280 and body 284. As shown in FIG. 7, the shank 276 extends through opposed flanges 226, 228 of a band 216 and through a reaction member 242 positioned between the flanges 226, 228, wherein the slotted neck 280 is adapted for interference fit through the reaction member 242 to enable pre-assembly of the bolt and reaction member onto the flange 228 in a manner that will prevent the bolt from inadvertently slipping off the flange. Prior to tightening the nut 252 onto the bolt 248, there is clearance between the shank 276 and a top of an aperture 272 in the flange 226, as depicted in FIG. 7. As the nut 252 is tightened, however, the top of the aperture 272 is drawn closer to the shank 276, as depicted in FIG. 8. Under some circumstances, such as maximum material conditions of the bolt 248 and band 216, the top of the aperture 272 of the flange 226 initially contacts the threaded body 284 instead of the slotted neck 280, as depicted in FIG. 9. As the nut 252 is further tightened, the top of the aperture 272 of the flange 226 of the band 216 substantially interferes with and traverses the conical transition 286 between the different diameters of the body 284 and neck 280. Under this interference condition, rundown torque applied to the nut 252 tends to fluctuate, thereby resulting in inconsistent nut torques, which translate into unpredictable clamp loads. In turn, unpredictable clamp loads lead to variable results in joint strength.

SUMMARY OF THE INVENTION

In accordance with one aspect of the invention, there is provided a band clamp for connecting automotive exhaust pipes or other tubular members preferably using a nut and bolt fastener that allows for more consistent rundown of the nut. The band clamp comprises a band including a circumferentially-extending body portion and radially-extending opposed flanges at opposite ends of the body portion. The flanges each have an aperture for receiving a bolt of the fastener so that the body portion can be fit at least partially around the tubular members and then tightened using the bolt.

The bolt has a head at a first end and a shank extending from the head and terminating in a second end. The shank includes a neck extending from the head toward the second end, a threaded body extending from the second end toward the first end, and a tapered transition located between the neck and body. This tapered transition extends only partially around the shank such that a portion of the neck has a common surface with the body. During tightening, if the radially inward facing surface of the aperture in the flange engages the threaded body, then during further tightening, this surface can slide along the threaded body across the common surface and onto the neck without having to traverse and ride up over the tapered transition. This enables the bolt to be used with a reaction member that is press-fit onto the neck of the bolt for pre-assembly of the clamp while avoiding interference between the bolt and flange aperture that can otherwise cause inconsistent and unpredictable clamp loads.

In accordance with another aspect of the invention, there is provided a band clamp which uses a nut along with either the unique bolt design noted above or with a conventional bolt that has a tapered transition circumscribing the entire bolt. The nut has a shoulder that engages the tapered transition when the nut is tightened onto the bolt to thereby cause a sharp increase in torque required to further thread the nut onto the bolt.

In accordance with yet another aspect of the invention, there is provided a method of fastening a band clamp around tubular members, comprising the steps of:

providing a band including a circumferentially-extending body portion having a pair of radially-extending opposed flanges located at opposite ends of the body portion;

inserting a bolt through apertures in the opposed flanges, the bolt including a head at a first end and a shank extending from the head and terminating in a second end, the shank including a neck extending from the head toward the second end, a threaded body extending from the second end toward the first end, and a tapered transition between the neck and body;

assembling a nut to the threaded body of the bolt, the nut having a shoulder;

monitoring torque applied to the nut; and tightening the nut to the bolt until the monitored torque increases due to engagement of the shoulder of the nut with the tapered transition of the shank of the bolt.

DETAILED DESCRIPTION OF PREFERRED EMBODIMENT

Figure 1:
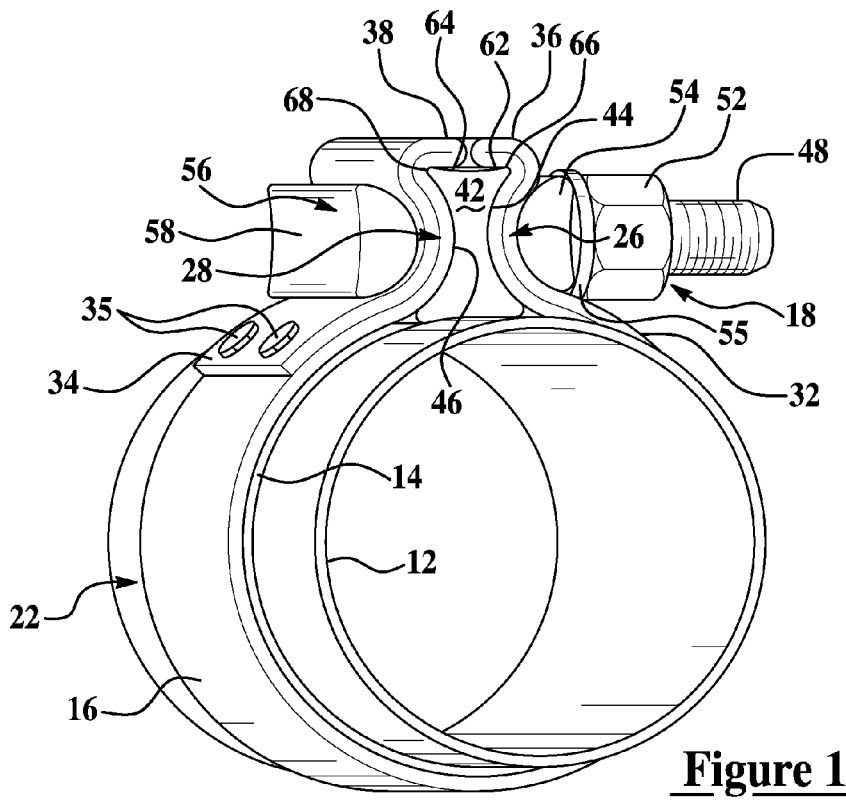
FIG. 1 is a perspective view of a band clamp according to an exemplary embodiment of the present invention.

Referring now to the drawings, the invention is shown in two exemplary embodiments of a band clamp especially adapted for use in coupling pipe ends together to form a pipe joint in vehicle exhaust systems. In exhaust system applications, the band clamp is preferably made of steel. In the illustrated embodiments, the invention is implemented in a band clamp with a single bolt in the tightening mechanism in the manner shown in U.S. Pat. No. 4,629,226 to Cassel et al. The invention can also be implemented with a tightening mechanism having two bolts as disclosed in U.S. Pat. No. 4,813,270 to Cassel or U.S. Pat. No. 6,758,501 to Amedure et al. It will be appreciated as the description proceeds, that the invention is useful in many different applications and may be implemented in many other embodiments. For example, the invention can be used not only for band clamps that permit connecting pipes in a telescopic overlap condition, but also for pipe couplers that are typically applied to pipes fitted in an end-to-end configuration. As used herein, the term "band clamp" is used to refer to both pipe couplers and band clamps. Furthermore, the terms axially, angularly, and radially refer to directions relative to the generally circular shape of the illustrated pipe couplers, so that the axial direction extends along the longitude or axis of this circular shape, radial directions extend radially away from this axis, and angularly refers to locations at points around the circumference of the band clamp.

FIG. 1 depicts a band clamp 10, according to a first exemplary embodiment, that is applied over a lap joint of inside and outside pipes 12 and 14, respectively, in telescoping relationship. The outside pipe 14 has a lap portion which extends over the inside pipe 12 to provide an overlap region of the pipes under the band clamp 10. In order to provide a fluid seal between the pipes, a collapsible sealing zone (not shown) is provided on the outside pipe 14 in the overlap region. This pipe joint is, for example, of the type shown in the above-mentioned Cassel et al. U.S. Pat. No. 4,629,226.

The band clamp 10 comprises a clamp band 16 and a fastener or tightening mechanism 18. The band 16 is preferably disposed around the outer pipe 14 directly over the sealing zone. Additionally, the present invention contemplates that a sealing sleeve and/or gasket (not shown) may be interposed between one or both of the pipes 12, 14 and the band 16. In any case, the band 16 is substantially circular or roundish in cross-section. The band 16 has a generally circumferentially-extending body portion or sector 22 that is adapted to fit around the sealing zone on the pipe 14, and also has a channel-shaped portion or sector 24 that includes a pair of generally radially-extending sidewalls or flanges 26 and 28 that extend radially outwardly from the body sector 22. The band 16 is made of a single piece of sheet metal and each free end thereof is preferably folded back on itself to form outer layers or flaps 32 and 34, which overlay the inner layer in face-to-face engagement. In this manner, the flanges 26 and 28 and a portion of the body sector 22 are made of double thickness. Alternatively, however, the flanges 26, 28 may be single layers, wherein the free ends thereof are not folded back to provide a double thickness. The double thickness provides a cross-sectional area through the flanges 26, 28 that is equal to or greater than that in the single layer portion of the band 16. The flaps 32 and 34 are secured to the inner layer of the band 16 by respective fasteners 33, 35, such as rivets, weldments, or the like, that inhibit slippage of the inner layer relative to the flaps 32, 34. The flanges 26, 28 are provided at their outer ends with respective lateral flanges or ears that constitute stop members 36 and 38.

The band 16 is cinched around the pipes 12, 14 by the tightening mechanism 18. The tightening mechanism 18 comprises a spline or reaction member 42 which is disposed within the channel-shaped sector 24 and extends outwardly from the pipe 14 with its inner end adapted to seat upon the outer surface of the pipe 14. For this purpose, the reaction member 42 has an inner surface of arcuate configuration conforming to the pipe 14. The reaction member 42 is provided with a pair of oppositely facing concave surfaces 44 and 46. The tightening mechanism 18 includes a bolt 48, a nut 52, and a spacer bar 54 and washer 55 disposed outside the flange 26. The bar 54 has a convex surface which is opposite the concave surface 44 of the reaction member 42. The bolt 48 has a head 56 in the form of a bar with a convex surface which is disposed outside the flange 28 opposite the concave surface 46 on the reaction member 42. The bolt 48 extends through apertures or bolt holes 72, 74 in the flanges 26 and 28, the reaction member 42, washer 55 and the spacer bar 54.

Figure 2:
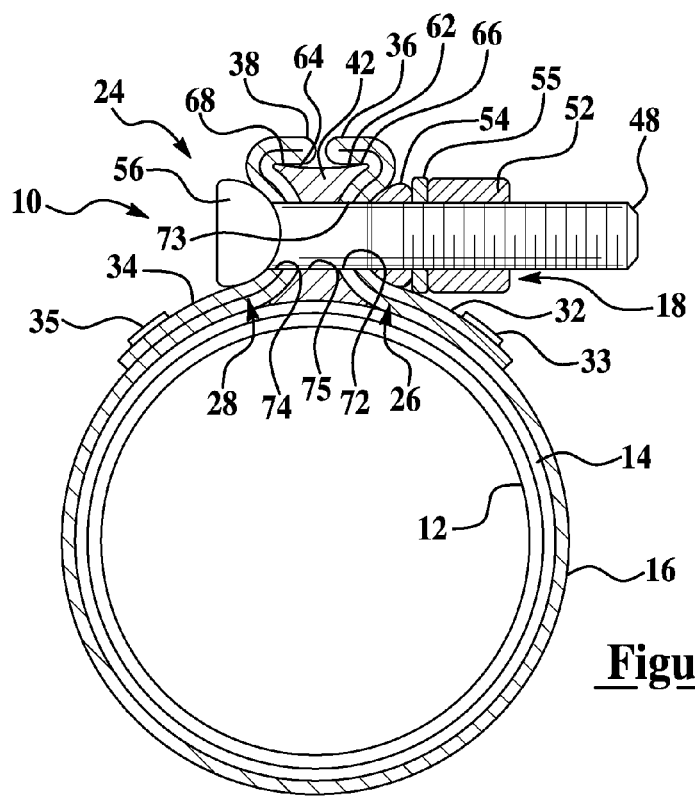
FIG. 2 is a partial cross-sectional view of A band clamp as defined in FIG. 1.

When the band clamp 10 is assembled and the nut 52 is tightened on the bolt 48, the relationship of the parts is as shown in FIGS. 1 and 2. It will be understood that, before the nut 52 is tightened, the flanges 26 and 28 of the channel-shaped sector 24 are not seated against the reaction member 42. When the nut 52 is tightened, the bolt head 56 and the spacer bar 54 are drawn together and press the flanges 26 and 28 into engagement with the reaction member 42. Depending upon the degree of tightening, the flanges 26, 28 may be only partially seated against the reaction member 42. As a result of this tightening action, the roundish sector 22 is stretched around the pipes 12, 14 in tight engagement therewith. This cinching action of the band clamp 10 exerts sufficient force on the sealing zone to provide a good fluid seal and high pull-apart strength in the pipe joint.

The relationship of the parts of the band clamp 10 when it is in the tightened condition will now be described in greater detail with reference to FIG. 2. The stop member 36 has a stop surface 62 on its lower side which is engaged by an abutment surface 66 on the upper end of the reaction member 42 when the band clamp 10 is fully tightened. Similarly, the stop member 38 has a stop surface 64 on its lower side which is engaged by an abutment surface 68 on the upper end of the reaction member 42. With the clamp in the tightened condition, the inner end of the reaction member 42 is firmly seated against the outer pipe 14.

As noted above, the band 16 is made from a single piece of sheet metal and each end thereof is folded back on itself to form outer layers or flaps 32 and 34 which overlay the inner layer in face-to-face engagement. During the fabrication of the band 16 prior to the pre-forming of the flanges 26 and 28, the apertures or bolt holes 72 and 74 are punched through the flanges 26, 28 with the band 16 in a flat condition. The desired spacing between the bolt holes 72, 74 through the flanges 26, 28 is that which results in alignment of the centerlines of the bolt holes 72 and 74 through the flanges 26 and 28 with each other and with the centerline of the bolt hole 75 through the reaction member 42 when the band 16 is tightened to the condition shown in FIG. 2. This spacing of the bolt holes 72 and 74 from each other is determined in accordance with the desired diameter of pipe 14, height of the reaction member 42 and location of the bolt hole 75 through the reaction member 42. It should be noted here that the band 16 is preformed to a configuration which is generally similar to that shown in FIG. 2, except that the channel-shaped sector 24 is open wider such that either or both flanges 26 and 28 may be located outboard of the reaction member 42. The band 16 is fastened around the pipes 12, 14 by rotating or tightening the nut 52 onto the bolt 48, wherein the flange 26 is drawn toward the reaction member 42 over the bolt 48 without substantial interference therewith. Substantial interference of the flange 26 with the bolt 48 is avoided using a unique bolt design that will now be described.

Figure 3:
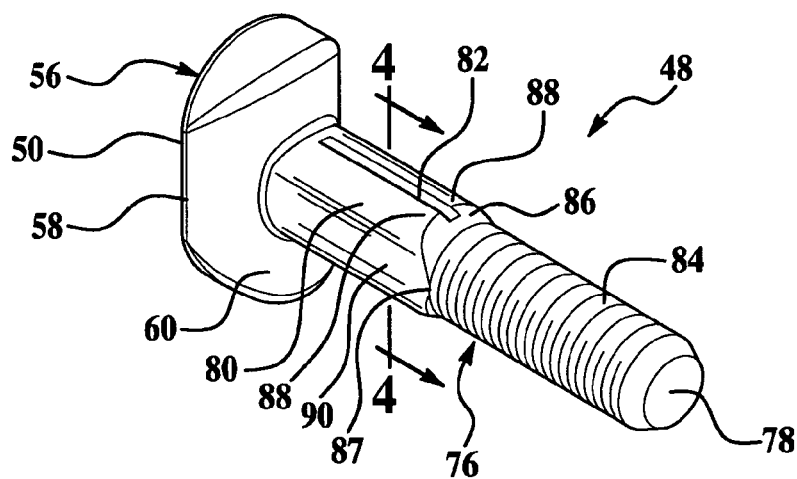
FIG. 3 is perspective view of a bolt used in A band clamp as defined in FIG. 1.

FIG. 3 illustrates the bolt 48 with the unique bolt design according to one aspect of the present invention. The bolt 48 includes a head 56 defining a first end 50 of the bolt 48, and a cylindrical shank 76 that extends longitudinally away from the head 56 and terminates in an opposite, second end 78 of the bolt 48. As shown in FIGS. 1 through 3, the head 56 includes a flat end face 58 that extends generally longitudinally parallel with the axis of the pipes 12, 14 and band 16, and a rounded portion 60 that conforms to the concave profile of the flange 28. Referring again to FIG. 3, the bolt 48 is shown rotated ninety degrees from its orientation depicted in FIG. 1. The shank 76 includes a slotted neck 80 having at least one open-ended slot 82 formed therein, a threaded body 84 of reduced diameter compared to the slotted neck 80, and a tapered transition 86 provided between the neck 80 and body 84. To improve the consistency of nut rundown on the bolt 48, the conventional shank design has been modified from the typical round cross-sectional shape associated with conventional band clamp bolts.

Figure 4:
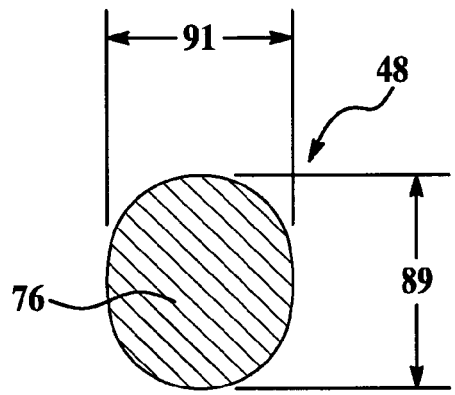
FIG. 4 is a cross-sectional view of the bolt of FIG. 3, taken along line 4—4 thereof.

As better shown in FIG. 4, the neck 80 of the shank 76 is preferably oval-shaped in cross-section. As defined herein, oval means non-circular; thus, oval includes shapes such as egg-shaped, elliptical, or truncated circle or ellipse, and includes shapes that are not piece-wise continuous or mathematically defined geometric shapes. Elliptical means a closed plane curve generated by points for which a sum of distances from each point to two fixed points is constant. For example, an ellipse may be a planar conic section whose plane is not parallel to an axis, base, or generatrix of an intersected cone. Truncated circle or ellipse means a circle or ellipse that is circumferentially truncated at one or more portions around the circumference of the circle or ellipse. For example, opposed flats may extend chordally of two points on a curve, which is thereby truncated by the flats. In another example, as shown in FIG. 4, the shank 76 may have a major diameter 89 that is truncated by opposed arc segments which in effect define a minor diameter 91. In other words, and as shown in FIGS. 3 and 4, these examples illustrate that the shank 76 includes at least a portion having a partially cylindrical cross section 88 that is further defined by at least one relieved segment portion 90. As defined herein, relieved segment may mean a portion of a generally cylindrical cross section that is cut off by one or more points, lines, planes, curves, arcs, or the like. Moreover, given the relieved segment portion 90, the tapered transition 86 is not necessarily a continuous annulus circumscribing the shank 76. Rather, the tapered transition 86 may include interrupted tapered portions, as shown in the illustrated embodiment.

Referring now to FIGS. 2 and 3, the oval-shaped shank 76 minimizes the difference in diameters between the threaded body 84 and the slotted neck 80 in an area where a portion of the flange 26 of the band 16 would otherwise contact the bolt 48. For example, such an area may be a radially inwardly facing surface 73 partially defining the aperture 72 of the flanges 26. A minimized or common surface 87 is defined between the threaded body and the slotted neck by virtue of the relieved segment 90. The present invention contemplates that only one relieved segment 90 may be provided, in contrast to the two opposed relieved segments shown in FIGS. 3 and 4. Accordingly, the terminology minimized surface or common surface means adjacent surfaces with minimal or no step or transition therebetween.

Therefore, as the nut 52 is tightened onto the bolt 48, the flange 26 more smoothly traverses the shank 76 of the bolt 48 with the novel design features of the present invention, without incurring substantial interference between the flange 26 and a conical transition of a conventional bolt design. In other words, the bolt 48 is designed to accommodate a substantial sliding fit of the bolt 48 with respect to the flange 26. The sliding fit is enabled by use of the relieved segment portion 90, or oval-shaped portion of the shank 76 that defines the minimized or common surface or diameter 87 over which the flange 26 slides without substantial interference. Thus, the nut 52 may be applied to the bolt 48 with a more consistent required torque across the length of the rundown of the nut 52.

In general, the rundown of a nut to a bolt in a band clamp is unique from other fastener applications. Many fastener applications are designed based on the amount of tensile forces desired at a given applied nut torque. In developing the present invention, however, it was discovered that band clamp loads may be accurately assessed by monitoring the axial position of the nut relative to the bolt at an applied torque. As the nut is tightened down on the bolt, the opposed flanges of the band cinch together, thereby applying strain on the band. This strain on the band creates the desired clamp load of the band clamp. Thus, clamp loads can be correlated to the amount of axial rundown of the nut.

Figure 5A:
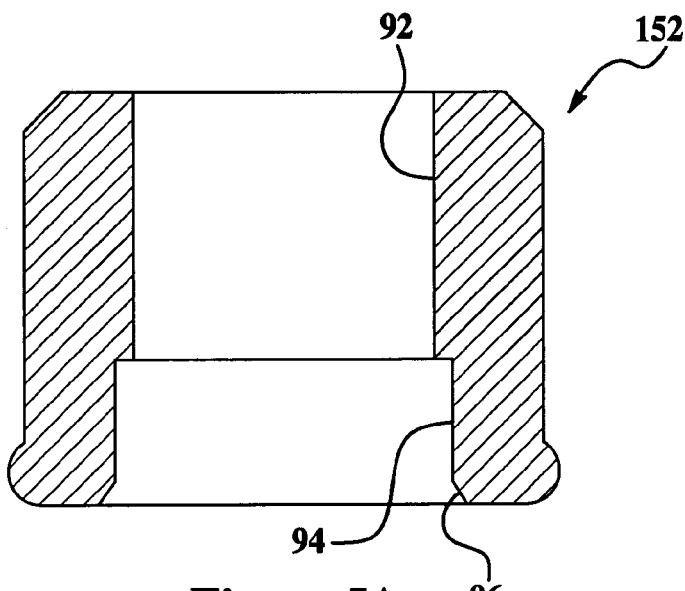
FIG. 5A is a cross-sectional view of a nut that can be used in connection with a second embodiment of the invention.
Figure 5B:
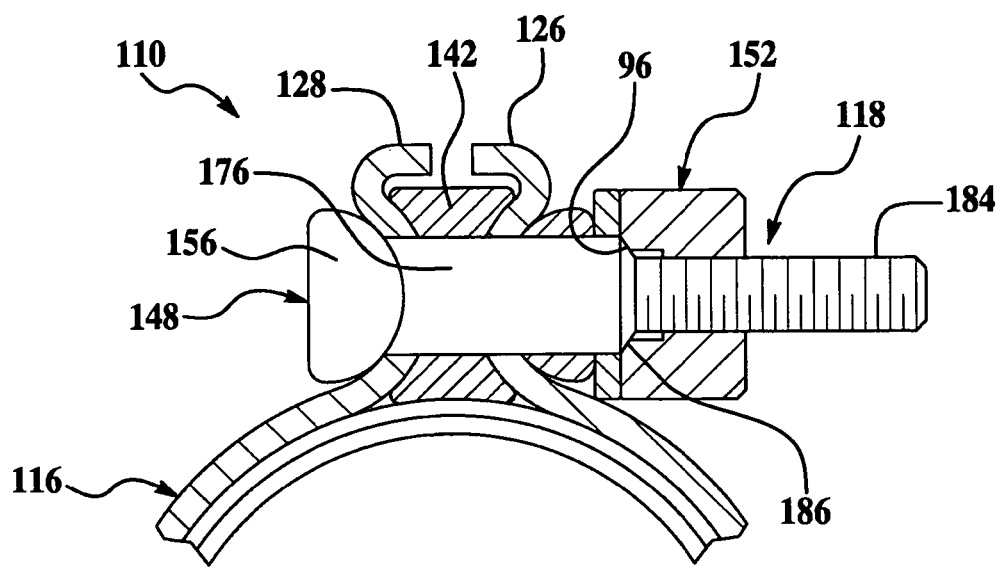
FIG. 5B is a partial cross-sectional view of a band clamp according to the second embodiment and using the nut of FIG. 5A.
Figure 6:
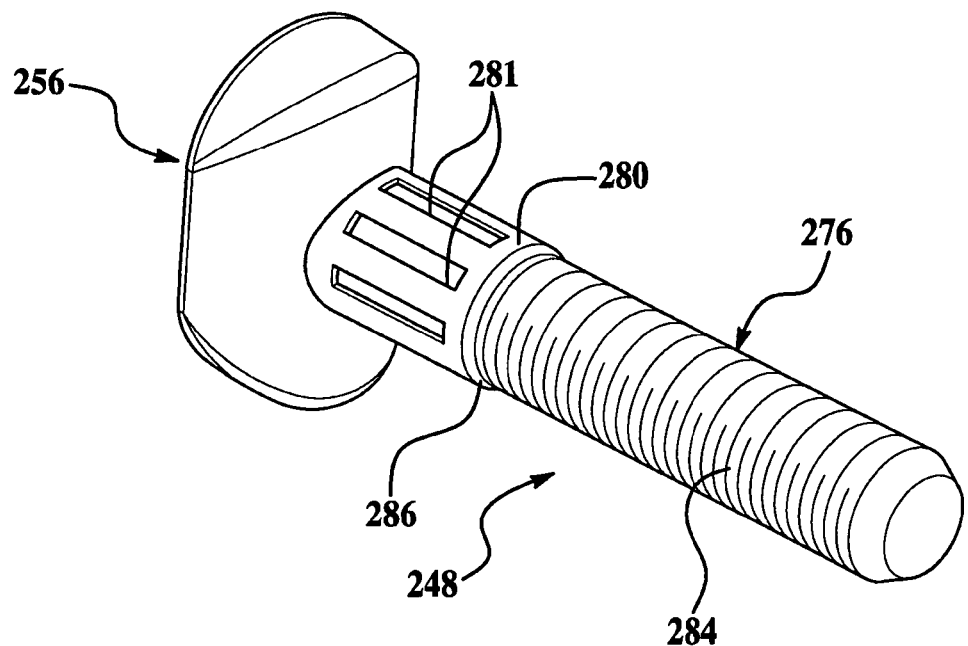
FIG. 6 is a perspective view of a prior art bolt used in a conventional band clamp depicted by FIGS. 7 through 9, according to prior art.
Figure 7:
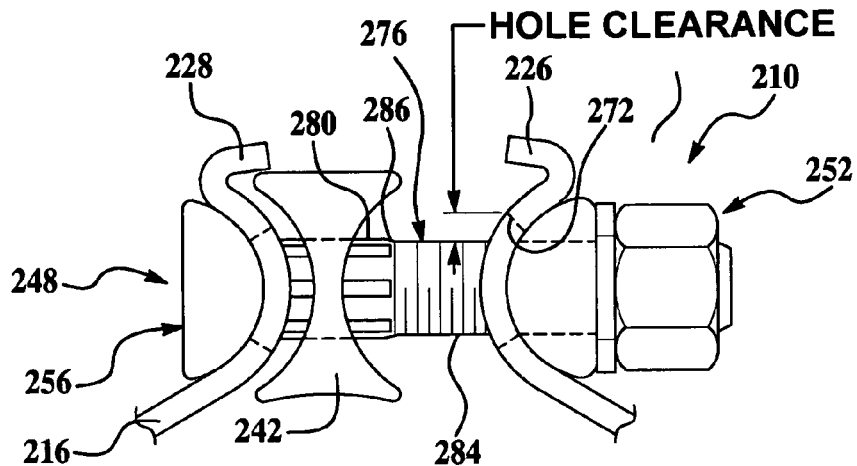
FIG. 7 is a side view of a prior art band clamp using the conventional bolt of FIG. 6 with a conventional nut initially threaded onto the bolt.
Figure 8:
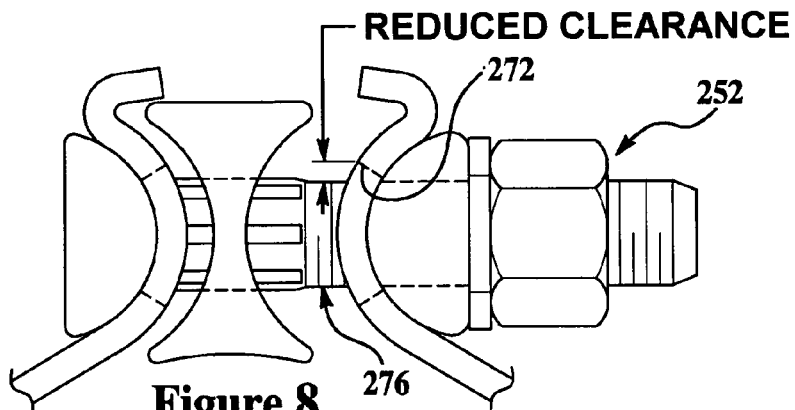
FIG. 8 is a side view of the prior art band clamp of FIG. 7, illustrating the nut being partially threaded onto the bolt as the clamp is tightened.
Figure 9:
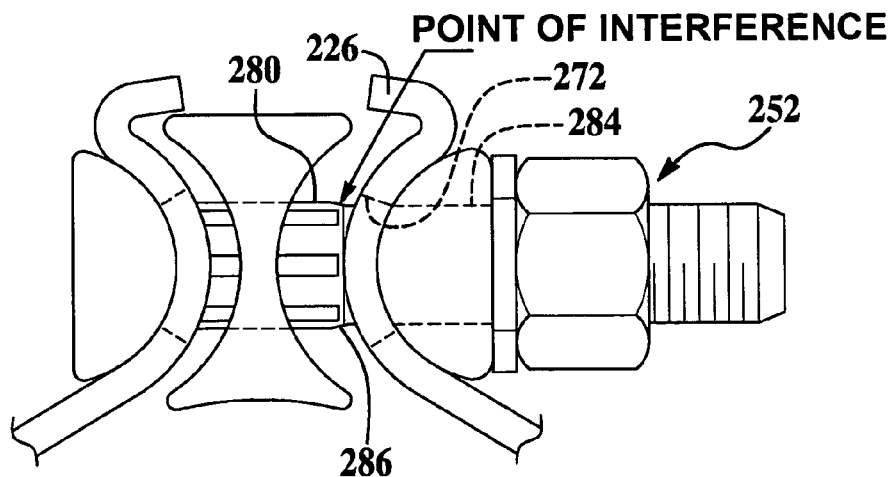
FIG. 9 is another side view of the prior art band clamp of FIG. 7, illustrating the nut being further threaded onto the bolt as the clamp is further tightened.

Accordingly, FIGS. 5A and 5B together illustrate a second exemplary embodiment 110 of the present invention which includes a nut 152 having a throughbore defined by a threaded portion 92, a counterbore 94, and a shoulder 96. As shown in FIG. 5B, this nut 152 is especially adapted for predictable axial engagement with a bolt 148 which can be a conventional bolt such as shown in FIG. 6 or an unconventional bolt such as shown in FIG. 3. The bolt 148 is inserted through opposed flanges 126, 128 of a band 116 and through a reaction member 142. The threaded portion 92 is provided for circumferential interengagement with a threaded body 184 of a shank 176 of the bolt 148. In the illustrated embodiment, the shoulder 96 is in the form of a chamfer that provides positive axial engagement with a tapered transition 186 of the shank 176 of the bolt 148. The engagement features of the chamfer 96 and tapered transition 186 are designed to engage at a predetermined desired axial position to create a sharp increase, or step, in required torque during rundown of the nut 152 on the bolt 148. In other words, the tapered transition 186 is preferably located axially along the shank 176 of the bolt 148 a predetermined distance from a head 156 that is correlated with an optimal clamp load. Such a desired predetermined distance may be arrived at for a given clamp design using reasonable calculations or routine experimentation. The nut 152 may be tightened to the bolt 148 until rundown torque on the nut 152 jumps due to engagement of the chamfer 96 with the tapered transition 186 at the predetermined position on the shank 176. This sudden increase in torque required to further thread the nut is easily detectable using a currently available torque monitoring system of a conventional assembly tool such as a nut runner (not shown). When the step in torque is detected, the nut runner stops and the clamp is then considered fully tightened. A manual torque wrench set to an appropriate torque can be used as well. The manufacturing tolerances of the length of the band clamp between the bolt holes 72, 74, as well as the relevant dimensions of nut 52 and bolt 148, such as the axial location of the chamfer 96 and tapered transition 186, can be held very precisely and repeatably thereby enabling consistent band clamp tightening and, in turn, consistent clamp loads for a given diameter pipe.

It will thus be apparent that there has been provided in accordance with this invention a fastener and related band clamp that achieve the aims and advantages specified herein. It will, of course, be understood that the forgoing description is of preferred exemplary embodiments of the invention and that the invention is not limited to the specific embodiments shown. Various changes and modifications will become apparent to those skilled in the art. For example, the reaction member could be implemented as an integral, unitary extension of one of the flanges, rather than a separate component as shown in the figures. All such changes and modifications are intended to be within the scope of this invention.

As used in this specification and appended claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A band clamp, comprising:
a band including a circumferentially-extending body portion having a pair of opposed radially-extending flanges at opposite ends of said body portion, said flanges each having an aperture therethrough; and
a fastener for drawing said opposed flanges of said band together such that said band can be tightened, said fastener including a bolt extending through said apertures of said opposed flanges and including a head at a first end and a shank extending from said head and terminating in a second end, said shank including at least a portion thereof having a partially cylindrical cross section defined at least in part by a relieved segment portion that, during tightening of said clamp, engages an inside surface of the aperture of the flange closest said second end of said bolt.

2. A band clamp, comprising:
a band including a circumferentially-extending body portion having a pair of opposed radially-extending flanges at opposite ends of said body portion, said flanges each having an aperture therethrough; and
a fastener for drawing said opposed flanges of said band together such that said band can be tightened, said fastener including:
a bolt extending through said apertures of said opposed flanges and including a head at a first end and a shank extending from said head and terminating in a second end, said shank including:
a neck extending from said head toward said second end,
a threaded body extending from said second end toward said first end, and
a tapered transition between said neck and said body; and
a nut threaded to said threaded body of said bolt, said nut having a shoulder that engages said tapered transition when said nut is tightened onto said bolt to thereby cause a sharp increase in torque required to further thread said nut onto said bolt.

3. A band clamp for connecting tubular members, comprising:
a band including a circumferentially-extending body portion that fits at least partially around the tubular members, said band further including radially-extending opposed flanges at opposite ends of said body portion, said flanges each having an aperture therethrough; and
a fastener for drawing said opposed flanges of said band together such that said band can be tightened about the tubular members, said fastener including a bolt extending through said apertures of said opposed flanges and including a head at a first end and a shank extending from said head and terminating in a second end, said shank including a neck extending from said head toward said second end, a threaded body extending from said second end toward said first end, and a tapered transition located between said neck and said body and extending only partially around said shank such that a portion of said neck has a common surface with said body.

4. A band clamp as defined in claim 3, wherein said neck includes a relieved segment portion that at least partially defines said common surface.

5. A band clamp as defined in claim 4, wherein said neck has an oval-shaped cross-section at said relieved segment portion.

6. A band clamp as defined in claim 4, wherein said apertures are at least partially defined by radially inward facing surfaces extending through said flanges, further wherein said relieved segment portion is adapted for sliding cooperation with at least one of said radially inward facing surfaces of said opposed flanges.

7. A band clamp as defined in claim 6, wherein said fastener further includes a nut threaded to said bolt, wherein as said nut is tightened onto said bolt at least one of said radially inward facing surfaces of said opposed flanges slides over said relieved segment portion, thereby reducing any substantial interference of said at least one radially inward facing surfaces with said bolt.

8. A band clamp as defined in claim 3, wherein said fastener includes a nut threaded to said bolt, said nut having a shoulder that engages said tapered transition.

9. A band clamp as defined in claim 8, wherein as said nut is tightened onto said bolt, said shoulder of said nut engages said tapered transition of said shank of said bolt to cause a sharp increase in torque required to further thread said nut onto said bolt.

10. A band clamp as defined in claim 3, wherein said tapered transition includes two interrupted tapered portions each extending approximately 180° about said shank, whereby said bolt includes two common surfaces each disposed 180° from the other about said shank.

11. A band clamp as defined in claim 10, wherein at least a first one of said flanges has a concave surface that is curved in the radial direction and said head of said bolt has a convex surface curved in one direction, wherein said convex surface mates with said concave surface of said first flange in a predetermined relative rotational orientation, and wherein said two common surfaces are oriented on said shank relative to said convex surface such that, when said bolt is attached to said first flange in said predetermined relative rotational orientation, said two common surfaces are radially spaced from each other and said two interrupted tapered potions are axially spaced from each other.

12. A band clamp as defined in claim 11, wherein said convex surface of said head of said bolt and said concave surface of said first flange mate with each other in either said predetermined relative rotational orientation or in a second relative rotational orientation in which said bolt is rotated about the axis of said shank by 180°.

13. A band clamp as defined in claim 3, wherein said threaded body has a circular cross-section, and said neck has an oval-shaped cross-section that includes a minor diameter equal in length to the diameter of said threaded body and a major diameter that is greater than said minor diameter.

14. A band clamp as defined in claim 13, wherein said head of said bolt mates with said flange such that said minor diameter of said neck extends along a radius of said band.

15. A band clamp for connecting tubular members, comprising:
a band including a circumferentially-extending body portion that fits at least partially around the tubular members, said band further including radially-extending opposed flanges at opposite ends of said body portion, said flanges each being formed by a unitary extension of said band that extends radially outwardly from said body portion to an outer free end of said flange where said unitary extension is folded back on itself to form inner and outer layers, wherein said inner and outer layers together have an aligned aperture and a curved profile in the radial direction that gives each flange a convex inner surface facing the other flange and an concave outer surface, said unitary extensions being secured to said body portion adjacent said flanges; and
a tightening mechanism that includes a reaction member, spacer bar, and fastener for drawing said opposed flanges of said band together such that said band can be tightened about the tubular members;
said reaction member having inner and outer ends separated from each other by a pair of oppositely facing concave surfaces that mate with the convex inner surfaces of said flanges;
said spacer bar having a convex surface that mates with said concave surface of a first one of said flanges, wherein said reaction member and said spacer bar each having an aperture that is aligned with the apertures of said flanges;
said fastener comprising a nut and bolt with said bolt extending through said apertures and including a head at a first end and a shank extending from said head and terminating in a second end, said head comprising a bar with a convex surface that mates with said concave surface of a second one of said flanges, said shank including a neck extending from said head toward said second end, a threaded body extending from said second end toward said first end, and a tapered transition located between said neck and said threaded body and extending only partially around said shank such that a portion of said neck has a common surface with said threaded body, said threaded body having a circular cross-section and said neck having an oval-shaped cross-section that includes a minor diameter equal in length to the diameter of said threaded body and a major diameter that is greater than said minor diameter;
wherein said apertures of said flanges are at least partially defined by radially inward facing surfaces extending through said flanges, and wherein said neck meets said threaded body at a common surface defined by an interruption in said tapered transition such that, during tightening of said fastener, said radially inward facing surface of said first flange can engage said threaded body and slide from said threaded body along said common surface to said neck during further tightening without engaging said tapered transition.

16. A band clamp as defined in claim 1, wherein said shank includes a neck extending from said head toward said second end, a threaded body extending from said second end toward said first end, and a tapered transition located between said neck and said body, said neck having said partially cylindrical cross section, and said tapered transition extending only partially around said shank such that said relieved segment portion of said neck has a common surface with said body.

17. A band clamp as defined in claim 1, wherein said partially cylindrical cross section is defined at least in part by two opposed relieved segment portions.

18. A band clamp as defined in claim 2, wherein said neck has an oval cross-section.

* * * * *